(12) United States Patent
Oda

(10) Patent No.: US 8,006,096 B2
(45) Date of Patent: Aug. 23, 2011

(54) INFORMATION PROCESSING APPARATUS

(75) Inventor: Akihiko Oda, Hino (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1005 days.

(21) Appl. No.: 11/362,677

(22) Filed: Feb. 27, 2006

(65) Prior Publication Data

US 2007/0101150 A1    May 3, 2007

(30) Foreign Application Priority Data

Nov. 2, 2005   (JP) ................................. 2005-319082

(51) Int. Cl.
*H04L 29/00* (2006.01)
(52) U.S. Cl. ............... 713/183; 713/184; 726/2; 726/4; 726/5
(58) Field of Classification Search .................. 713/183, 713/184; 726/4, 5
See application file for complete search history.

(56) References Cited

U.S. PATENT DOCUMENTS

| | | | | |
|---|---|---|---|---|
| 5,682,475 | A * | 10/1997 | Johnson et al. ................. | 726/18 |
| 6,400,805 | B1 * | 6/2002 | Brown et al. ............. | 379/88.01 |
| 7,382,878 | B2 * | 6/2008 | Volpert, Jr. ...................... | 380/37 |
| 2003/0163714 | A1 * | 8/2003 | Nortung ......................... | 713/189 |
| 2007/0022299 | A1 * | 1/2007 | Yoshimura .................... | 713/183 |

FOREIGN PATENT DOCUMENTS

JP    2002-229608 A    8/2002

* cited by examiner

*Primary Examiner* — Vivek Srivastava
*Assistant Examiner* — Anthony Brown
(74) *Attorney, Agent, or Firm* — Holtz, Holtz, Goodman & Chick, PC

(57) ABSTRACT

There is described an information processing apparatus, which makes it possible to discriminate the injustice inputting operation from the input error simply committed by the authorized user, in order to prevent the correct password from being illegally found by the injustice intruder. The apparatus includes: a storage section to store a first password, which is represented by a plurality of characters; an input section to input a second password which is represented by a plurality of characters; a comparing section to compare the first password with the second password inputted at the input section; a specifying section to specify a position of unmatched character of the second password when the first password and the second password is unmatched; and a time control section to control time for allowing to input a third password at the input section in accordance with the position specified by the specifying section.

12 Claims, 7 Drawing Sheets

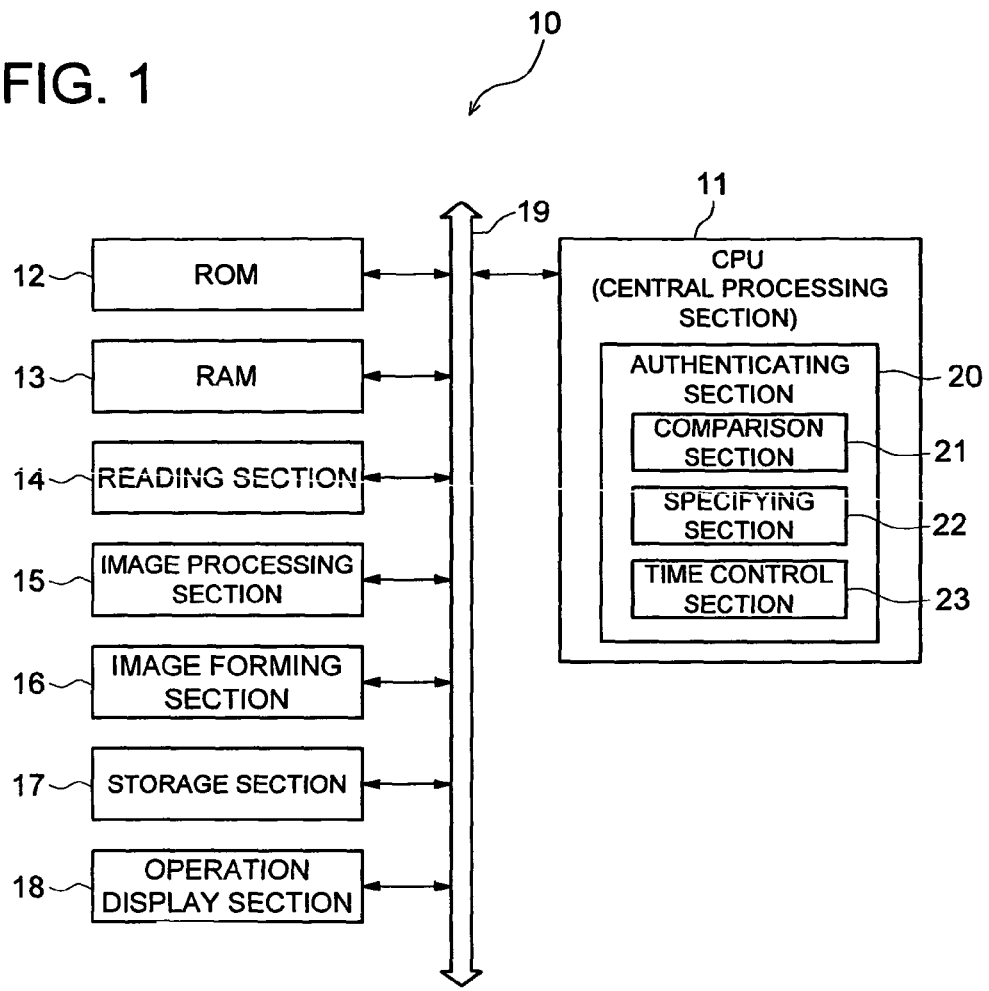

| POSITION AT WHICH DISCORDANCE INITIALLY OCCURS | RE-INPUT PROHIBITED TIME INTERVAL |
|---|---|
| FIRST BLOCK (1, 2 DIGIT) | 30 SEC |
| SECOND BLOCK (3, 4 DIGIT) | 20 SEC |
| THIRD BLOCK (5, 6 DIGIT) | 10 SEC |
| FOURTH BLOCK (7, 8 DIGIT) | 5 SEC |

| NUMBER OF UNMATCHED CHARACTERS | RE-INPUT PROHIBITED TIME INTERVAL |
|---|---|
| EQUAL TO OR MORE THAN FOUR CHARACTERS | 30 SEC |
| THREE CHARACTERS | 20 SEC |
| TWO CHARACTERS | 10 SEC |
| ONE CHARACTER | 5 SEC |

| FREQUENCY OF CASES IN WHICH DISCORDANCES CONTINUOUSLY OCCUR | RE-INPUT PROHIBITED TIME INTERVAL |
|---|---|
| EQUAL TO OR MORE THAN THREE TIMES | 60 SEC |
| TWO TIMES | 30 SEC |
| ONE TIME | 5 SEC |

INFORMATION PROCESSING APPARATUS

RELATED APPLICATION

This application is based on Japanese Patent Application NO. 2005-319082 filed on Nov. 2, 2005 in Japanese Patent Office, the entire content of which is hereby incorporated by reference.

BACKGROUND

1. Field of the Invention

The present invention relates to an information processing apparatus having a function for authenticating a password, and specifically relates to a technology for preventing a password from being illegally deduced by using an injustice method and a technology without deteriorating a maneuverability of the password inputting operation conducted by the authorized user.

2. Description of the Related Art

A certain image forming apparatus has a function for authenticating a password, which makes it impossible to print a confidential document, etc., or to transmit it to an external device if the predetermined password is not inputted in the image forming apparatus. However, there has been a risk that the correct password can be deduced by sequentially inputting a lot of passwords, being different from each other, one by one, for instance, by employing the dictionary attacking method in which listed words are sequentially inputted one by one, the round-robin attacking method in which many passwords automatically created according to a predetermined rule are sequentially inputted one by one, etc.

As the countermeasure to cope with the abovementioned attacking trial, for instance, Patent Document 1 has set forth a technology, which makes it difficult to illegally deduce the correct password by prohibiting the re-inputting operation of another password for a predetermined time period when an incorrect password is inputted, and accordingly, makes it impossible to re-input many passwords one by one within a short time period.

Patent Document 1

Tokkai 2002-229608 (Japanese Non-Examined Patent Publication)

A case, in which an incorrect password is inputted, is not limited to such the case of receiving the injustice attack as mentioned in the above. For instance, sometimes, an incorrect password is inputted due to an inputting error of the user or the ambiguity memory of the user.

According to the conventional technology mentioned in the above, however, when the authorized user erroneously inputted the incorrect password, since it is impossible for the authorized user to input again another password until a predetermined time period has elapsed, the maneuverability of the password inputting operation to be conducted by the authorized user is considerably deteriorated.

Further, although the more the number of characters, to be included in the password, increases, the smaller the risk that the correct password can be deduced becomes, such the increase of the characters will result in an increase of inputting errors and would be easily forgotten by the user. Accordingly, when the number of characters, to be included in the password, is increased for the purpose of improving the security, there has been a problem that a frequency of waiting times of the authorized user for repeatedly inputting the password due to simple inputting errors would also increase, resulting in a further deterioration of the maneuverability of the password inputting operation.

SUMMARY

To overcome the abovementioned drawbacks in conventional information processing apparatus, it is an object of the present invention to provide information processing apparatus, which makes it possible to discriminate the injustice inputting operation from the input error simply committed by the authorized user, in order to prevent the correct password from being illegally found by the injustice intruder without deteriorating the maneuverability when the authorized user simply commits the input error.

In view of foregoing, an object of this invention is to solve at least one of the problems, and to provide new information processing apparatus.

The information processing apparatus comprises a storage section to store a first password which is represented by a plurality of characters; an input section to input a second password which is represented by a plurality of characters; a comparing section to compare the first password stored in the storage section with the second password inputted at the input section; a specifying section to specify a position of unmatched character of the second password when the first password and the second password is unmatched; and a time control section to control time for allowing to input a third password at the input section in accordance with the position specified by the specifying section.

According to another aspect of the present invention, the information processing apparatus comprises a storage section to store a first password which is represented by a plurality of characters; an input section to input a second password which is represented by a plurality of characters; a comparing section to compare the first password stored in the storage section with the second password inputted at the input section; a specifying section to specify the number of unmatched characters of the second password when the first password and the second password is unmatched; and a time control section to control time for allowing to input a third password at the input section in accordance with the number specified by the specifying section.

According to another aspect of the present invention, the information processing apparatus comprises a storage section to store a first password which is represented by a plurality of characters; an input section to input a second password which is represented by a plurality of characters; a comparing section to compare the first password stored in the storage section with the second password inputted at the input section; a specifying section to specify a ratio of unmatched characters to all characters of the second password when the first password and the second password is unmatched; and a time control section to control time for allowing to input a third password at the input section in accordance with the ratio specified by the specifying section.

According to another aspect of the present invention, the information processing apparatus comprises a storage section to store a first password which is represented by a plurality of characters; an input section to input a second password which is represented by a plurality of characters; a comparing section to compare the first password stored in the storage section with the second password inputted at the input section; a specifying section to specify the number of a comparison result by the comparing section, in which the first password and the second password is consecutively unmatched, when the first password and the second password is unmatched; and a time control section to control time for allowing to input a third password at the input section in accordance with the number specified by the specifying section.

The invention itself, together with further objects and attendant advantages, will best be understood by reference to the following detailed description taken in conjunction with the accompanying drawings.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 1 shows a block diagram of an electrical configuration of an image forming apparatus embodied in the present invention;

FIG. 2 shows a configuration of a password used for an authenticating operation of the password;

FIG. 3 shows a first prohibited time controlling table indicating a relationship between a position at which discordance initially occurs and a password re-input prohibited time interval;

FIG. 5 shows a second prohibited time controlling table indicating a relationship between the number of unmatched characters and a password re-input prohibited time interval;

FIG. 7 shows a third prohibited time controlling table indicating a relationship between a frequency of discordance cases and a password re-input prohibited time interval.

DETAILED DESCRIPTION OF THE PREFERRED EMBODIMENT

Figure 4:
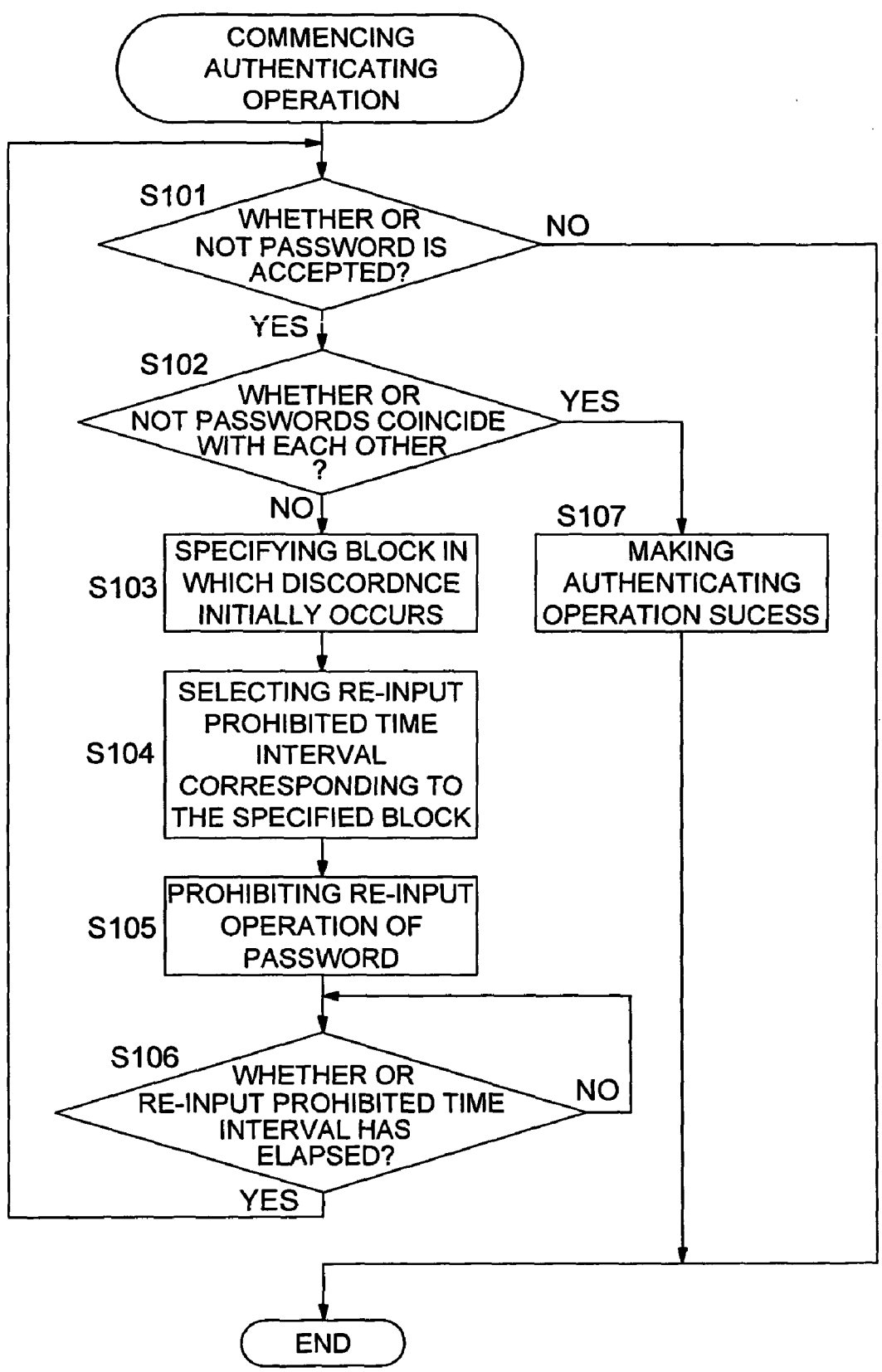
FIG. 4 shows a flowchart of controlling a password re-input prohibited time interval corresponding to a position at which an initial discordance occurs.

Referring to the drawings, the embodiment of the present invention will be detailed in the following.

An image forming apparatus, serving as an information processing apparatus that requires input of the password, will be exemplified as the embodiment of the present invention. The image forming apparatus embodied in the present invention is called a digital multi function peripheral that is provided with a copy function for reading a document in order to form a reproduced image of the document on a recording paper, a printing function for receiving print data from a PC (Personal Computer) in order to form a corresponding image on the recording paper, etc.

Further, the image forming apparatus is also provided with various kinds of functions, which requires an authentication with password when receiving a request from the user, such as, for instance, a box function, a confidential printing function, etc. The box function is such a function that, when image data, etc. are stored in the storage device, the image data can be categorized into every management unit called a box. When a password is allotted to the box, it is impossible for the user to access the image data stored in the box unless the user inputs the correct password.

Further, the confidential printing function is a kind of printing function that, when printing a confidential document or a like, the printing data are temporarily stored into the storage device or the like with setting a password, and then, the printing operation based on the stored printing data is not implemented unless the user inputs the correct password.

FIG. 1 shows a block diagram of an electric configuration of an image forming apparatus 10 embodied in the present invention.

The image forming apparatus 10 is provided with a CPU (Central Processing Unit) 11 for totally controlling the operations of the image forming apparatus 10. A ROM (Read Only Memory) 12, a RAM (Random Access Memory) 13, a reading section 14, an image processing section 15, an image forming section 16, a storage section 17 and an operation display section 18 are coupled to the CPU 11 through a bus line 19.

The ROM 12 has a function of storing programs and various kinds of fixed data to be executed by the CPU 11. The RAM 13 functions as a work memory for temporarily storing various kinds of data when the CPU 11 executes a program, and functions as a page memory for temporarily storing the image data.

The reading section 14 has a function of reading a document in order to acquire image data corresponding to the document. The reading section 14 is provided with a light source for irradiating the document, a line image sensor for reading the document every one line in its width direction, a moving mechanism for shifting a reading position in a unit of one line in the longitudinal direction of the document and an optical path constituted by lenses and mirrors for guiding light reflected from the document so as to focus the light onto the line image sensor. The analogue signals, outputted from the line image sensor, are converted to the digital data through the A/D (Analogue to Digital) converting action, and the converted digital data are outputted as digital image data.

The image processing section 15 has a function of enlarging/compressing a size of the digital image data and processing the digital image data so as to rotate a reproduced image.

The image forming section 16 has a function of forming the reproduced image based on the digital image data onto a recording paper through the electro-photographic process so as to output the reproduced image formed on the recording paper. The image forming section 16 is provided with a conveying mechanism of the recording paper, a photoreceptor drum, a charging device, a laser unit, a developing device, a transferring/separating device, a cleaning device and a fixing device, so as to be constituted as a laser printer.

The storage section 17 is a large capacity storage device for storing compressed image, data print data, etc. In this embodiment, the hard disc device is employed for the storage section 17. In addition, the storage section 17 also has a function of storing a password data, established for authenticating an inputted password, in advance as a nonvolatile data.

The operation display section 18 is constituted by a liquid-crystal display provided with a touch panel on its surface and various kinds of operating switches, and has functions of displaying various kinds of guide information or status information to be indicated to the user and receiving various kinds of instructions inputted by the user. Further, the operation display section 18 also serves as an input device, which has a function of receiving the password inputted by the user when authenticating the password.

Further, the CPU 11 also serves as an authenticating section 20, which has a function of authenticating the password inputted by the user.

Concretely speaking, the authenticating section 20 includes a comparison section 21, a specifying section 22 and a time control section 23. The comparison section 21 has a function of comparing the inputted password, inputted from the operation display section 18, with the stored password, stored in the storage section 17. As a result of comparing operation performed by the comparison section 21, only when the both passwords coincide with each other, the password authenticating operation is succeeded, and then, the requests from the user can be received.

Further, as a result of comparing operation performed by the comparison section 21, when the both passwords do not coincide with each other and the password authenticating operation is failed, the specifying section 22 specifies a position of a specific character in the inputted password, which does not coincide with a specific character in the stored password at the same position, so as to determine whether the incorrect password is inputted by an injustice attack or by an input error committed by the authorized user. Then, the specifying section 22 outputs the specified result to the time control section 23. In this case, the specifying section 22 serves as a position specifying section.

When the password authenticating operation is failed, the time control section 23 controls a length of time interval until the re-inputting operation of the password is allowed (hereinafter, referred to as a password re-input prohibited time interval), based on the position of the unmatched character, which is inputted from the specifying section 22.

Next, the principle of discriminating the injustice inputting operation from the input error committed by the authorized user, wherein the specifying section 22 employs the position of the unmatched character as an indicator, will be detailed in the following.

In this embodiment, the injustice inputting operation is discriminated from the input error, committed by the authorized user, by using the fact that, when the comparing operation of the password is performed in order from a high order digit to a low order digit, the lower the position of the character at which the discordance initially occur is, the higher the possibility, that the operator who inputted the password knows the correct password, is.

Taking the case that the password having a series of numeral characters of total N digit including 0-9 (totally 10 characters) is inputted in order from the high order digit as an example, a probability Px of making it possible to accidentally input the password, in such a manner that numeral characters from the highest order digit to the "n" order digit in middle are correctly inputted while the character of (n+1) digit becomes discordance, can be found by the equation as follow.

$$Px=(1/10)^n \times (9/10) \times 100\%$$

For instance, the case, in which the password is inputted in such a manner that numeral characters from the first order digit to the third order digit are correctly inputted while the discordance occurs at the character of the fourth digit, is considered as follow. According to the abovementioned equation, the probability Px of making it possible to accidentally input this password is calculated as Px=about 0.1%. Since the value of 0.1% is extremely small, it would be hardly considered that the password is accidentally inputted as an actual case. In other words, it would be highly possible that the user who knew the correct password happened to input a wrong numeral character at the fourth order digit when inputting the password in order from a high order digit.

According to the abovementioned equation, the probability Px of making it possible to correctly input the numeral characters up to a mid course of the password is getting smaller according as the initial discordance occurs at a lower order digit (namely, "n" is getting larger). Accordingly, the possibility that the password is a result of the input error is getting higher according as the initial discordance occurs at a lower order digit.

On the other hand, in the injustice inputting operation, since the inputting operation is commenced in a state that the correct password is completely unknown, almost of all inputted characters are liable not to coincide with those of the correct password from the beginning of the password. Accordingly, it could be considered that the initial discordance occurs at a higher order digit in almost of all injustice inputting cases.

In this embodiment, by using the abovementioned difference between the injustice inputting operation and the input error committed by the authorized user, it is determined that the lower the position of the character at which the discordance initially occur is, the higher the possibility of the input error committed by the authorized user is. Incidentally, it is also applicable that the password is divided into blocks, each having plural digits, and it is determined that the lower the position of the block in which the discordance of the character initially occur is, the higher the possibility of the input error committed by the authorized user is.

Further, in the case of the input error, the user commits the input error at a random position in the password. For this reason, when the authorized user happened to make mistake at a position of high order digit, it would be determined that this inputting operation was the injustice one. However, the possibility that the user who knows the correct password commits again the input error at the time of re-inputting operation, and further, the position of the input error is again at a high order digit could be considered as very low. Accordingly, since the risk of erroneously judging the input error for consecutive two times would be negligibly small, there is virtually no problem for this matter.

Next, the method for specifying the position at which the initial discordance occurs will be detailed in the following.

FIG. 2 shows a configuration of the password used for authenticating operation of the password.

The password includes eight digit characters, to each of which a digit number of 1-8 is attached in order from the high order digit located at the left end position. Further, this character series is divided every two digits into four blocks, to each of which a block name of first block—eighth block is attached in order from the high order block located at the left end portion.

The line (a) in FIG. 2 shows an example of the correct password stored in the storage section 17. The password is constituted by the alphabetical characters of "A, B, C, D, E, F, G, H" in order from the high order digit.

In the case that the abovementioned password is established, when the wrong password is inputted from the operation display section 18 and the authenticating operation is failed, the specifying section 22 specifies the position at which the initial discordance occurs with respect to the inputted password. Concretely speaking, each of the characters of the correct password stored in the storage section 17 is compared with each of the characters of the password inputted from the operation display section 18 one by one in order from the high order digit and at the same digit number, and then, the block which includes a character at which the initial discordance occurs is specified as the position of the character which is incorrectly inputted as the password.

For instance, the line (b) in FIG. 2 shows an example of the incorrect password inputted from the operation display section 18. In this example, characters of "A, B, C, D, R, F, G, J" are inputted in order from the high order digit, and as a result, the fifth digit character of R and the eighth digit character of J do not coincide with the characters of the correct password. With respect to this password, confirming the position of the unmatched character in order from the high order digit, the initial discordance occurs at the position of the fifth order digit. Since this character is included in the third block, the third block is specified as the position at which the discordance initially occurs.

Next, a relationship between the position of the unmatched character and the password re-input prohibited time interval will be detailed in the following. FIG. 3 shows a first prohibited time controlling table 30 indicating the relationship between the position at which the discordance initially occurs and the password re-input prohibited time interval.

In the first prohibited time controlling table 30, the password re-input prohibited time interval is established corresponding to the position at which the discordance initially occurs. According to the first prohibited time controlling table 30, the password re-input prohibited time interval for the case that the initial discordance occurs at a position in the first block is the longest, and then, is getting shorter according as the position moves into the second block, the third block, and finally, the password re-input prohibited time interval corresponding to the fourth block is the shortest. Incidentally, the first prohibited time controlling table 30 is stored in advance in the ROM 12 or etc.

The time control section 23 acquires information in regard to the position at which the initial discordance occurs, from the specifying section 22, so as to select the password re-input prohibited time interval from the first prohibited time controlling table 30 on the basis of the acquired information. Then, the time control section 23 prohibits the re-inputting operation of the password until the selected time interval has elapsed. A concrete method for prohibiting the re-inputting operation of the password is to ban the operation display section 18 from displaying a "PASSWORD INPUTTING SCREEN" (not shown in the drawings) or to ban the "PASSWORD INPUTTING SCREEN" from accepting the next password to be inputted by the user. Namely, the method is not limited to a specific method.

FIG. 4 shows a flowchart of controlling the password re-input prohibited time interval corresponding to the position at which the initial discordance occurs.

The image forming apparatus 10 commences the authenticating operation when receiving the implementation request of the job, which utilizes a function requiring the authenticating operation of the password. Then, the image forming apparatus 10 confirms whether or not the password is accepted (Step S101), and when a cancellation of the implementation demand is accepted or the password is not received during a fixed time interval (Step S101; N), finalizes the authenticating operation as it is without doing anything (End).

If the password is accepted (Step S101; Y), the image forming apparatus 10 confirms whether or not the inputted password coincides with the correct password stored in advance (Step S102), and when determining that the inputted password coincides with the correct password (Step S102; Y), makes the authenticating operation success (Step S107) to finalize the operation (End).

On the other hand, when determining that the inputted password does not coincide with the correct password (Step S102; N), the image forming apparatus 10 specifies the block in which the discordance initially occurs (Step S103), and then, selects the password re-input prohibited time interval corresponding to the specified block (Step S104) in order to prohibit the re-inputting operation during the selected time interval (Step S105).

The image forming apparatus 10 waits as it is in a standby state until the selected time interval has elapsed (Step S106; N), and when the selected time interval has passed (Step S106; Y), returns to the step of confirming whether or not the newly-inputted password is accepted (Step S101).

In the image forming apparatus 10 embodied in the present invention, if the incorrect password is inputted at the time of the authenticating operation of the password, the password re-input prohibited time interval is controlled in such a manner that the higher the digit position at which the discordance initially occurs is, the longer the password re-input prohibited time interval is made, while the lower the digit position at which the discordance initially occurs is, the shorter the password re-input prohibited time interval is made. In the injustice inputting operation, since the correct password is completely unknown for the injustice intruder, the initial discordance would occur at a high order digit in almost of all cases. On the other hand, when the authorized user who knows the correct password inputs each of characters included in the correct password one by one in order from the highest order digit, sometimes, he would commit an input error at the lower order digit. Accordingly, by setting the password re-input prohibited time intervals as mentioned in the above, corresponding to the position at which the discordance initially occurs, it becomes possible to smoothly accept the next password re-inputted by the authorized user without allowing the injustice intruder to successively input new passwords one by one.

According to the abovementioned embodiment, since it is impossible for the injustice intruder to successively input different passwords one by one within a short time period, it becomes virtually impossible for the injustice intruder to illegally find the correct password in an easy way. On the other hand, with respect to the input error, since the new password re-inputted by the authorized user can be easily accepted within a short time period, the maneuverability is not deteriorated, compared to the conventional method in which the password re-input prohibited time interval is constantly established at a relatively long time period. Further, since the re-input prohibited time interval is not lengthened to a long time even if the authorized user commits a simple input error, it becomes possible to increase the number of characters included in the password for improvement of the security without considering the deterioration of the maneuverability.

Incidentally, the establishment of the password re-input prohibited time intervals corresponding to the positions at which the discordances initially occur is not limited to the example indicated in the first prohibited time controlling table 30, but may be freely established as needed. For instance, the position at which the discordance initially occurs is specified in a unit of the digit, instead of the block, so as to divide the re-input prohibited time interval into finer steps for controlling.

Further, the method for controlling the password re-input prohibited time interval corresponding to the position at which the discordance initially occurs is not limited to the method for comparing the password in order from the high order digit so that the higher the position at which the discordance initially occurs is, the longer the password re-input prohibited time interval is lengthened. For instance, when the user memorizes the password in vague, sometimes, there would be a constant rule for a position of a unmatched character, such as "He always makes mistake at the final two digit", etc. Accordingly, it is applicable that the position at which the authorized user is liable to commit an input error is determined in advance by employing a statistical analyzing method, and then, when the discordance occurs at such the position, the password re-input prohibited time interval is made to be shortened. In this connection, the position at which the authorized user is liable to commit an input error may be determined by considering either a tendency of general users or each of the users concerned.

Next, the second embodiment, in which the number of characters which do not coincide with the correct password is employed as indicators, will be detailed in the following.

The image forming apparatus 10 of the second embodiment has an electric configuration same as that shown in FIG. 1. However, the specifying section 22 employed in the second embodiment serves as a discordance number specifying section, while the specifying section 22 employed in the first embodiment serves as a position specifying section. Further, the time control section 23 in the second embodiment controls the password re-input prohibited time interval, corresponding to the number of unmatched characters included in the password, instead of the position at which the initial discordance occurs as employed in the first embodiment.

At first, the principle for discriminating an injustice attack from input errors by employing the number of unmatched characters included in the inputted password as an indicator by the specifying section 22 will be detailed in the following.

In the injustice inputting operation, since the inputting operation is commenced in a state that the correct password is completely unknown, almost of all inputted characters are liable not to coincide with those of the correct password from the beginning of the password. On the other hand, in the case of the input error, since the authorized user has already known the correct password in advance, the number of unmatched characters would be small.

Accordingly, in the second embodiment, the number of unmatched characters is employed as an indicator for discriminating the injustice attack from the input errors committed by the authorized user, and the system is so constituted that the larger the number of unmatched characters becomes, the higher the possibility of the injustice attack is determined.

In the case that a series of characters in eight digits is inputted as the password, when the authenticating operation is failed, the specifying section 22 specifies the number of characters, which are incorrectly inputted. Concretely speaking, each of the characters of the correct password stored in the storage section 17 is compared with each of the characters of the password inputted from the operation display section 18 one by one at the same digit number, and then, the unmatched characters are counted.

FIG. 5 shows a second prohibited time controlling table 31 indicating the relationship between the number of unmatched characters and the password re-input prohibited time interval.

In the second prohibited time controlling table 31, the password re-input prohibited time interval is established corresponding to the number of unmatched characters. According to the second prohibited time controlling table 31, the password re-input prohibited time interval for the case that the number of unmatched characters is equal to or larger than four characters, is the longest, and then, is getting shorter according as the number of unmatched characters decreases to three characters, two characters, and finally, the password re-input prohibited time interval for the case that the number of unmatched characters is equal to one character, is the shortest. Incidentally, the second prohibited time controlling table 31 is stored in advance in the ROM 12 or etc.

The time control section 23 acquires information in regard to the number of unmatched characters, from the specifying section 22, so as to select the password re-input prohibited time interval from the second prohibited time controlling table 31 on the basis of the acquired information. Then, the time control section 23 prohibits the re-inputting operation of the password until the selected time interval has elapsed.

Figure 6:
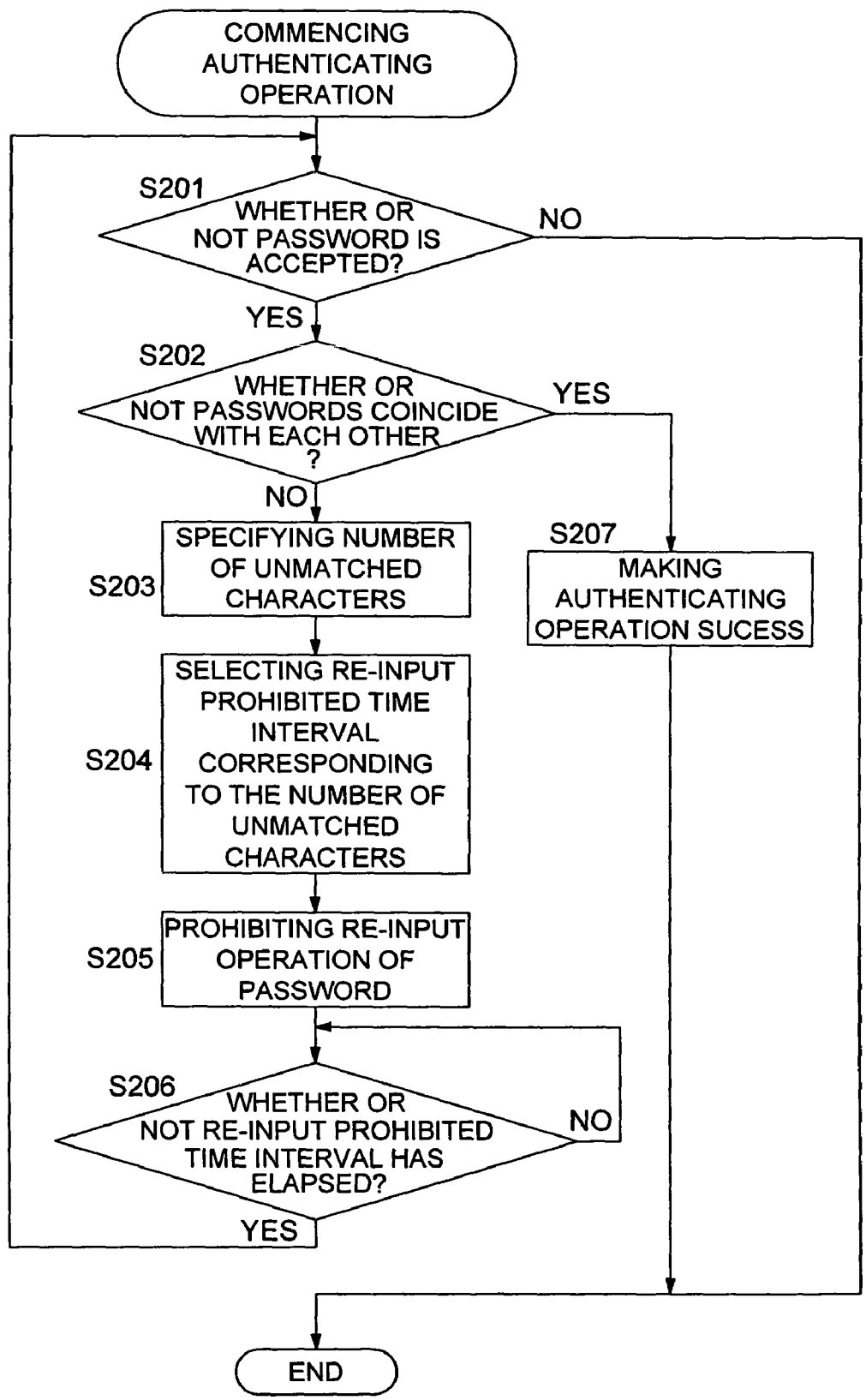
FIG. 6 shows a flowchart of controlling a password re-input prohibited time interval corresponding to the number of unmatched characters.

FIG. 6 shows a flowchart of controlling the password re-input prohibited time interval corresponding to the number of unmatched characters. The image forming apparatus 10, which commences the authenticating operation, confirms whether or not the password is accepted (Step S201), and, when a cancellation of the implementation demand is accepted or the password is not received (Step S201; N), finalizes the authenticating operation as it is without doing anything (End).

If the password is accepted (Step S201; Y), the image forming apparatus 10 confirms whether or not the inputted password coincides with the correct password established in advance (Step S202), and when determining that the inputted password coincides with the correct password (Step S202;Y), makes the authenticating operation success (Step S207) to finalize the operation (End).

On the other hand, when determining that the inputted password does not coincide with the correct password (Step S202; N), the image forming apparatus 10 specifies the number of unmatched characters (Step S203), and then, selects the password re-input prohibited time interval corresponding to the number of unmatched characters (Step S204) in order to prohibit the re-inputting operation during the selected time interval (Step S205).

The image forming apparatus 10 waits as it is in a standby state until the selected time interval has elapsed (Step S206; N), and when the selected time interval has passed (Step S206;Y), returns to the step of confirming whether or not the newly-inputted password is accepted (Step S201).

In the image forming apparatus 10 of the second embodiment, if the incorrect password is inputted at the time of the authenticating operation of the password, the password re-input prohibited time interval is controlled in such a manner that the larger the number of unmatched characters is, the longer the password re-input prohibited time interval is made, while the smaller the number of unmatched characters is, the shorter the password re-input prohibited time interval is made. There is a tendency that the number of unmatched characters detected in the injustice inputting operation is different from that detected in the input error committed by the authorized user. Accordingly, by setting the password re-input prohibited time interval as mentioned in the above, corresponding to the abovementioned difference between them, it becomes possible to smoothly accept the next password re-inputted by the authorized user without allowing the injustice intruder to successively input new passwords one by one.

According to the abovementioned embodiment, it becomes possible not to deteriorate the maneuverability of the user who commits a simple input error, while the injustice intruder hardly find the correct password by repeating the injustice inputting operations of the incorrect passwords. Further, since the re-input prohibited time interval is not lengthened to a long time even if the authorized user commits a simple input error, it becomes possible to increase the number of characters included in the password for improvement of the security without considering the deterioration of the maneuverability.

Incidentally, the correspondence relationship between the number of unmatched characters and the password re-input prohibited time interval is not limited to the example indicated in the second prohibited time controlling table 31. For instance, although, in the second prohibited time controlling table 31, the re-input prohibited time interval is set at a fixed time interval even if the number of unmatched characters exceeds four characters, it is also applicable that the re-input prohibited time interval is further extended according as the increase of the number of unmatched characters. In this connection, it is applicable that the re-input prohibited time interval is further extended in proportion to the increase of the number of unmatched characters or is abruptly extended when the number of unmatched characters exceeds a predetermined value. Namely, this method is not limited to a specific pattern.

Further, instead of specifying the number of unmatched characters by the specifying section 22, the system may be so constituted that the re-input prohibited time interval is controlled corresponding to a ratio of the number of unmatched characters to the total number of characters included in the correct password. In this case, the specifying section 22 serves as a discordance ratio specifying section.

For instance, when the total number of characters included in the password is not fixed, sometimes, the number of unmatched characters included in a long password becomes large, compared to that included in a short password, in spite that ratios of unmatched characters versus total characters in both cases are the same. Accordingly, instead of controlling the re-input prohibited time interval corresponding to the number of unmatched characters, by controlling it corresponding to its ratio, it becomes possible to make the maneuverability when inputting the long password equivalent to that when inputting the short password.

Next, the third embodiment, in which a frequency of the cases that the comparison results with the correct password continuously result in the discordance is employed as an indicator, will be detailed in the following.

The image forming apparatus 10 of the third embodiment has an electric configuration same as that shown in FIG. 1. However, the specifying section 22 employed in the third embodiment serves as a discordance times specifying section, while the specifying section 22 employed in the first embodiment serves as a position specifying section. Further, the time control section 23 in the third embodiment controls the password re-input prohibited time interval, corresponding to a frequency of the cases in which discordances continuously occur, instead of the position at which the initial discordance occurs as employed in the first embodiment.

At first, the principle for discriminating an injustice attack from input errors by employing a frequency of the cases in which discordances continuously occur as an indicator by the specifying section 22, will be detailed in the following.

In the injustice inputting operation, since the inputting operation is commenced in a state that the correct password is completely unknown, in almost of all cases, the illegal re-inputting operations of the various passwords would be repeated many times until the correct password has been found. On the other hand, in the case of the input error, since the authorized user has already known the correct password in advance, the number of re-inputting operations would be limited to around one or two times.

Accordingly, in the third embodiment, the frequency of the cases in which discordances continuously occur is employed as an indicator for discriminating the injustice attack from the input errors committed by the authorized user, and the system is so constituted that the larger the frequency becomes, the higher the possibility of the injustice attack is determined.

In the case that a predetermined password is inputted, when the authenticating operation is failed, the specifying section 22 specifies the frequency of the cases in which discordances continuously occur. Concretely speaking, in the authenticating operation of the password to be conducted after the implementation request of the job, which utilizes a function requiring the authenticating operation of the password, is received, the specifying section 22 counts the frequency of the cases in which the comparison results outputted by the comparison section 21 are discordances.

FIG. 7 shows a third prohibited time controlling table 32 indicating the relationship between the frequency of the discordance cases and the password re-input prohibited time interval.

In the third prohibited time controlling table 32, the password re-input prohibited time interval is established corresponding to the frequency of the discordance cases. According to the third prohibited time controlling table 32, the password re-input prohibited time interval for the case that the frequency of the discordance cases is equal to one time, is the shortest, and then, is getting longer according as the frequency of the discordance cases increases, and finally, the password re-input prohibited time interval for the case that the frequency of the discordance cases is equal to or more than three times, is the longest. Incidentally, the third prohibited time controlling table 32 is stored in advance in the ROM 12 or etc.

The time control section 23 acquires information in regard to the frequency of the discordance cases, from the specifying section 22, so as to select the password re-input prohibited time interval from the third prohibited time controlling table 32 on the basis of the acquired information. Then, the time control section 23 prohibits the re-inputting operation of the password until the selected time interval has elapsed.

Figure 8:
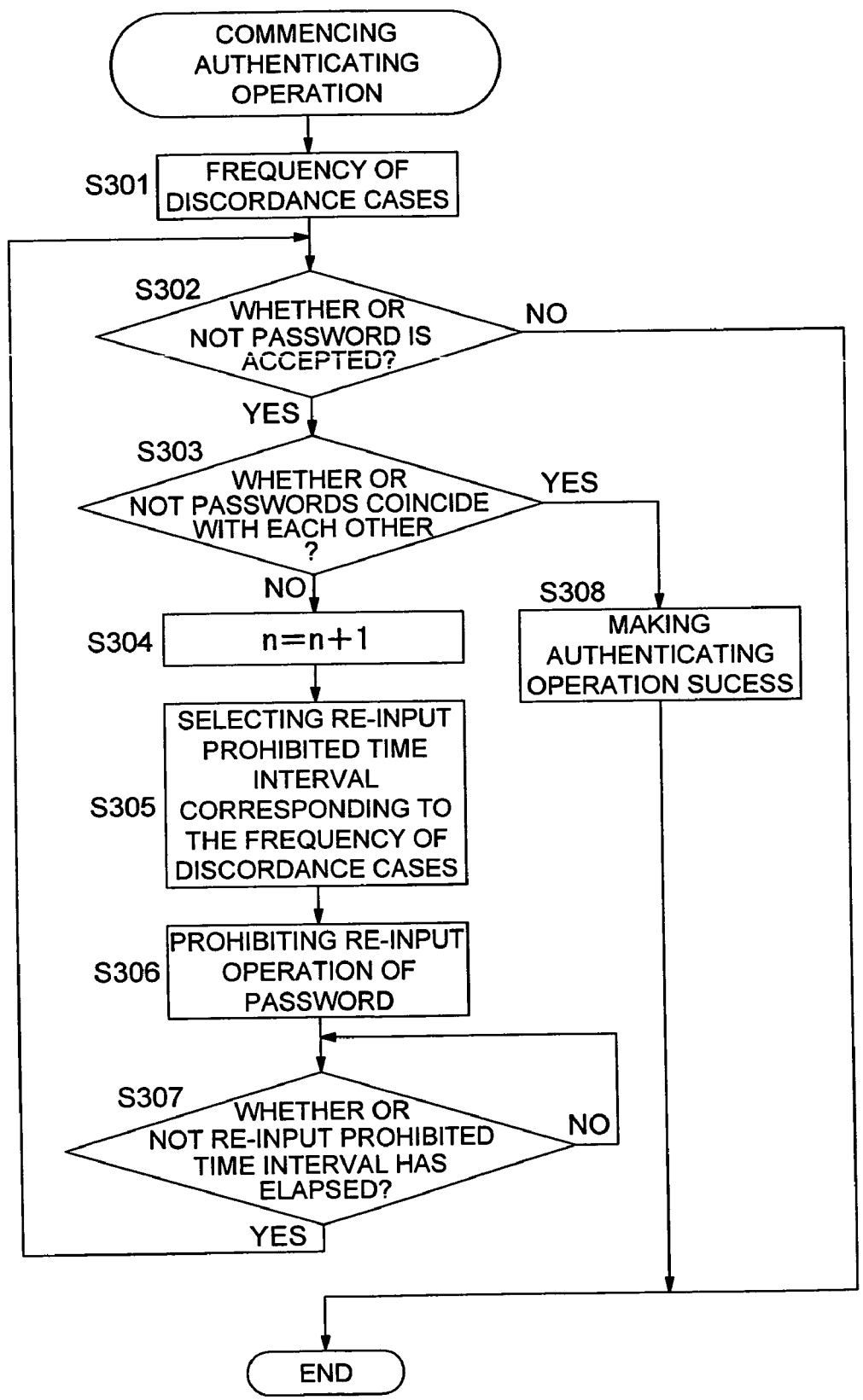
FIG. 8 shows a flowchart of controlling a password re-input prohibited time interval corresponding to a frequency of the cases in which the comparison results are discordances.

FIG. 8 shows a flowchart of controlling the password re-input prohibited time interval corresponding to the frequency of the cases in which the comparison results are discordances. The image forming apparatus 10, which commences the authenticating operation, resets the value of the counter for counting the frequency of the cases in which the comparison results are discordances to "zero" (Step S301). Then, the image forming apparatus 10 confirms whether or not the password is accepted (Step S302), and, when a cancellation of the implementation demand is accepted or the password is not received (Step S302; N), finalizes the authenticating operation as it is without doing anything (End).

If the password is accepted (Step S302; Y), the image forming apparatus 10 confirms whether or not the inputted password coincides with the correct password established in advance (Step S303), and when determining that the inputted password coincides with the correct password (Step S303; Y), makes the authenticating operation success (Step S308) to finalize the operation (End).

On the other hand, when determining that the inputted password does not coincide with the correct password (Step S303; N), the image forming apparatus 10 specifies the frequency of the discordance cases by adding "1" into the counter (Step S304), and then, selects the password re-input prohibited time interval corresponding to the frequency of the discordance cases specified (Step S305) in order to prohibit the re-inputting operation during the selected time interval (Step S306).

The image forming apparatus 10 waits as it is in a standby state until the selected time interval has elapsed (Step S307; N), and when the selected time interval has passed (Step S307; Y), returns to the step of confirming whether or not the newly-inputted password is accepted (Step S302).

In the image forming apparatus 10 of the third embodiment, if the incorrect passwords are continuously inputted at the time of the authenticating operation of the password, the password re-input prohibited time interval is controlled in such a manner that the larger the frequency of the discordance cases is, the longer the password re-input prohibited time interval is made. There is a tendency that the frequency of the discordance cases detected in the injustice inputting operation is different from that detected in the input error committed by the authorized user. Accordingly, by setting the password re-input prohibited time interval as mentioned in the above, corresponding to the abovementioned difference between them, it becomes possible to smoothly accept the next password re-inputted by the authorized user without allowing the injustice intruder to successively input new passwords one by one.

According to the abovementioned embodiment, it becomes possible not to deteriorate the maneuverability of the user who commits a simple input error, while the injustice intruder hardly find the correct password by repeating the injustice inputting operations of the incorrect passwords. Further, since the re-input prohibited time interval is not lengthened to a long time even if the authorized user commits a simple input error, it becomes possible to increase the number of characters included in the password for improvement of the security without considering the deterioration of the maneuverability.

Incidentally, the case that is determined as the "password inputting operation in which discordances continuously occur" is not limited to the case in which re-inputting operations of the different passwords are repeated. For instance, it would be also applicable to employ a method including the steps of: finalizing the authenticating operation after determining that the inputted password does not coincide with the correct password (in FIG. 8, Step S302; N—End); receiving again the implementation request of the job with respect to the same data in order to commence the authenticating operation again; and, if the re-inputted password does not coincide with the correct password again, determining this case as the "password inputting operation in which discordances continuously occur".

Further, the correspondence relationship between the frequency of the discordance cases and the password re-input prohibited time interval is not limited to the example indicated in the third prohibited time controlling table 32. For instance, although, in the third prohibited time controlling table 32, the re-input prohibited time interval is set at a fixed time interval even if the frequency of the discordance cases exceeds three times, it is also applicable that the re-input prohibited time interval is further extended according as the increase of the frequency of the discordance cases. In this connection, it is applicable that the re-input prohibited time interval is further extended in proportion to the increase of the frequency of the discordance cases or is abruptly extended when the frequency of the discordance cases exceeds a predetermined value. Namely, this method is not limited to a specific pattern.

Referring to the drawings, the preferred embodiments of the present invention have been detailed in the foregoing. However, the scope of the present invention is not limited to the aforementioned embodiments. Disclosed embodiments can be varied by a skilled person without departing from the spirit and scope of the invention.

In this specification, the image forming apparatus 10 is exemplified as an embodiment of the present invention. However, it is needless to say that the present invention is also applicable for various kinds of apparatuses (information processing apparatuses) having a function of authenticating the password.

Further, the method for selecting the password re-input prohibited time interval is not limited to the exemplified method in which the re-input prohibited time interval is selected on the basis of any one of the indicators disclosed in the first through the third embodiments. It is also applicable that the password re-input prohibited time interval is determined by employing plural kinds of indicators. For instance, when an incorrect password is inputted, plural kinds of indicators, such as the position at which the discordance initially occur and the number of the unmatched characters, are simultaneously specified so as to select a suitable time interval form the re-input prohibited time intervals determined in advance, corresponding to the combination of the indicators (for instance, "the initial discordance occurs at the first block, and the number of the unmatched characters is two", etc.).

Other than the above, a method of totally adding the password re-input prohibited time intervals, each corresponding to each of the indicators, as indicated as "(re-input prohibited time interval based on the first indicator)+(re-input prohibited time interval based on the second indicator), etc. would be also applicable. In this connection, a weighting operation for each of the indicators would be also applicable.

Further, although the operation display section 18 serves as a password inputting section in the present embodiments, it is applicable that a network interface would also serves as a password inputting section. For instance, this feature is applicable for a case when the implementation request of the job, which utilizes a function requiring the authenticating operation of the password, is received from a personal computer coupled to the network.

According to the information processing apparatus embodied in the present invention, when an incorrect password is inputted, based on the indicators, such as the position of the character at which the discordance occurs, the number of unmatched characters or the ratio, the frequency of the cases in which the discordances continuously occur, the apparatus determines whether or not the possibility of the injustice inputting operation is higher than that of the input error committed by the authorized user. Then, the apparatus makes the password re-input prohibited time interval long when determining that the possibility of the injustice inputting operation is higher than that of the input error, while the apparatus makes the password re-input prohibited time interval short when determining that the possibility of the input error is higher than that of the injustice inputting operation. In this manner, the apparatus can control the password re-input prohibited time interval corresponding to the result of the determining operation. Accordingly, since it is impossible for the injustice intruder to successively input different passwords one by one within a short time period, it becomes virtually impossible for the injustice intruder to illegally find the correct password in an easy way. On the other hand, with respect to the input error, since the new password re-inputted by the authorized user can be easily accepted within a short time period, the maneuverability is not deteriorated, compared to the conventional method in which the password re-input prohibited time interval is constantly established at a relatively long time period.

It is to be noted that various changes and modifications will be apparent to those skilled in the art. Therefore, unless such changes and modifications depart from the scope of the present invention, they should be construed as being included therein.

What is claimed is:

1. An information processing apparatus having a function for authenticating a password inputted therein, so as to make it possible to disable a predetermined function unless the inputted password matches a predetermined password, comprising:

a storage section to store a first password which is represented by a plurality of characters, said first password serving as the predetermined password;

an input section to input a second password which is represented by a plurality of characters, said second password serving as the inputted password;

a comparing section to compare the first password stored in the storage section with the second password inputted at the input section;

a specifying section to specify a position of an unmatched character of the second password when the first password and the second password do not match, said second password thereby being an incorrect password; and a time control section to control a time before allowing input of a third additional password at the input section after the incorrect password has been entered to be shorter or longer in accordance with the position specified by the specifying section.

2. The information processing apparatus of claim 1, wherein the time control section sets a first time when the position specified by the specifying section is in a high-order place of the second password, and sets a second time when the position specified by the specifying section is in a low-order place of the second password, and wherein input of the third password is prohibited until the set one of the first time and the second time elapses.

3. The information processing apparatus of claim 1, wherein the information processing apparatus is a part of an image forming apparatus.

4. An information processing apparatus having a function for authenticating a password inputted therein, so as to make it possible to disable a predetermined function unless the inputted password matches a predetermined password, comprising:

a storage section to store a first password which is represented by a plurality of characters, said first password serving as the predetermined password;

an input section to input a second password which is represented by a plurality of characters, said second password serving as the inputted password;

a comparing section to compare the first password stored in the storage section with the second password inputted at the input section;

a specifying section to specify a number of unmatched characters of the second password when the first password and the second password do not match, said second password thereby being an incorrect password; and a time control section to control a time before allowing input of a third additional password at the input section after the incorrect password has been entered to be shorter or longer in accordance with the number specified by the specifying section.

5. The information processing apparatus of claim 4, wherein the time control section sets a first time when the number specified by the specifying section is large, and sets a second time when the number specified by the specifying section is small, and wherein input of the third password is prohibited until the set one of the first time and the second time elapses.

6. The information processing apparatus of claim 4, wherein the information processing apparatus is a part of an image forming apparatus.

7. An information processing apparatus having a function for authenticating a password inputted therein, so as to make it possible to disable a predetermined function unless the inputted password matches a predetermined password, comprising:

a storage section to store a first password which is represented by a plurality of characters, said first password serving as the predetermined password;

an input section to input a second password which is represented by a plurality of characters, said second password serving as the inputted password;

a comparing section to compare the first password stored in the storage section with the second password inputted at the input section;

a specifying section to specify a ratio of unmatched characters to all characters of the second password when the first password and the second password do not match, said second password thereby being an incorrect password; and a time control section to control a time before allowing input of a third additional password at the input section after the incorrect password has been entered to be shorter or longer in accordance with the ratio specified by the specifying section.

8. The information processing apparatus of claim 7, wherein the time control section sets a first time when the ratio specified by the specifying section is large, and sets a second time when the ratio specified by the specifying section is small, and wherein input of the third password is prohibited until the set one of the first time and the second time elapses.

9. The information processing apparatus of claim 7, wherein the information processing apparatus is a part of an image forming apparatus.

10. An information processing apparatus having a function for authenticating a password inputted therein, so as to make it possible to disable a predetermined function unless the inputted password matches a predetermined password, comprising:

a storage section to store a first password which is represented by a plurality of characters, said first password serving as the predetermined password;

an input section to input a second password which is represented by a plurality of characters, said second password serving as the inputted password;

a comparing section to compare the first password stored in the storage section with the second password inputted at the input section;

a specifying section to specify a number of consecutively unmatched characters in the first password and the second password, when the first password and the second password do not match, said second password thereby being an incorrect password; and a time control section to control a time before allowing input of a third additional password at the input section after the incorrect password has been entered to be shorter or longer in accordance with the number specified by the specifying section.

11. The information processing apparatus of claim 10, wherein the time control section sets a first time when the number specified by the specifying section is large, and sets a second time when the number specified by the specifying section is small, and wherein input of the third password is prohibited until the set one of the first time and the second time elapses.

12. The information processing apparatus of claim 10, wherein the information processing apparatus is a part of an image forming apparatus.

* * * * *